United States Patent [19]
Kananen et al.

[11] Patent Number: 6,073,388
[45] Date of Patent: *Jun. 13, 2000

[54] MUSHROOM CASING SPAWN

[75] Inventors: David L. Kananen, Napoleon; Dena L. LaPolt, Bowling Green, both of Ohio; Jack A. McDaniel, Macungie, Pa.

[73] Assignee: Vlasic Farms, Inc., Cherry Hill, N.J.

[ * ] Notice: This patent is subject to a terminal disclaimer.

[21] Appl. No.: 09/134,939

[22] Filed: Aug. 17, 1998

[51] Int. Cl.[7] ............................ A01H 15/00; A01G 1/04
[52] U.S. Cl. ................................................... 47/1.1
[58] Field of Search .................................... 47/1.1

[56] References Cited

U.S. PATENT DOCUMENTS

| | | | |
|---|---|---|---|
| 3,560,190 | 2/1971 | Hughes et al. | 71/5 |
| 3,828,470 | 8/1974 | Stoller | 47/1.4 |
| 3,942,969 | 3/1976 | Carroll, Jr. et al. | 71/5 |
| 4,079,543 | 3/1978 | Stoller | 47/1.1 |
| 4,170,842 | 10/1979 | Stoller | 47/1.1 |
| 4,534,781 | 8/1985 | Wu et al. | 71/5 |
| 4,617,047 | 10/1986 | Bretzloff | 71/5 |
| 4,764,199 | 8/1988 | Pratt et al. | 71/5 |
| 4,776,872 | 10/1988 | Mulleavy et al. | 71/5 |
| 4,803,800 | 2/1989 | Romaine et al. | 47/1.1 |
| 4,848,026 | 7/1989 | Dunn-Coleman et al. | 47/1.1 |
| 4,874,419 | 10/1989 | Wu | 71/5 |
| 4,990,173 | 2/1991 | Katz et al. | 71/5 |
| 5,370,714 | 12/1994 | Ogawa et al. | 47/1.1 |
| 5,427,592 | 6/1995 | Romaine et al. | 47/1.1 |
| 5,443,612 | 8/1995 | Havens | 71/5 |
| 5,503,647 | 4/1996 | Dahlberg et al. | 47/1.1 |
| 5,759,223 | 6/1998 | Carlson et al. | 71/5 |

FOREIGN PATENT DOCUMENTS

| | | | |
|---|---|---|---|
| 0 700 884 | 3/1996 | European Pat. Off. | |
| 700884 | 3/1996 | European Pat. Off. | C05F 11/02 |
| 53107-476 | 9/1978 | Japan | C12K 1/00 |
| 2246566A | 2/1992 | United Kingdom | C05F 17/00 |

OTHER PUBLICATIONS

Chang et al. (Ed), The Biology and Cultivation of Edible Mushrooms, Academic Press, New York, pp. 244–248, 1978.

Kisarov, SU 1242050A, issued Jul. 7, 1986, Derwent, ACC# 1987–063121.

Rinaldi et al. 1974. The Complete Book of Mushrooms, Crown Publishers, Inc., New York, p. 271.

*Primary Examiner*—David T. Fox
*Assistant Examiner*—Anne Marie Grünberg
*Attorney, Agent, or Firm*—Banner & Witcoff, Ltd.

[57] ABSTRACT

A mushroom bed having a compost layer and a casing layer. The casing layer comprises casing spawn comprising a mixture of: (a) at least one proteinaceous ingredient in an amount to provide at least 3.5% nitrogen on a dry weight basis; (b) 2 to 30 wt % based on dry weight of paper pellets (c) 5 to 60 wt % based on dry weight of at least one particulate material, (d) a buffer in an amount effective to provide a pH of about 6 to 7.8, and (e) water; and colonized with mushroom mycelium.

25 Claims, No Drawings

MUSHROOM CASING SPAWN

TECHNICAL FIELD

The present invention relates to the art of mushroom cultivation and specifically pertains to an improved mushroom casing spawn that efficiently inoculates the mushroom casing layer and shortens the time required for the onset of mushroom production. This invention also provides a source of nutrients in the mushroom casing layer to further promote mushroom growth.

BACKGROUND OF THE INVENTION

The commercial production of mushrooms (*Agaricus bisporus*) involves a series of steps, including compost preparation, compost pasteurization, inoculating the compost with the mushroom fungus (spawning), incubation to allow thorough colonization of the compost with mushroom mycelia, top dressing the compost with moistened peat moss (casing), and controlling the environment to promote the development of mature mushrooms. The mushroom growing process is described in detail in several publications (for example, Chang & Hayes, 1978; Flegg et al., 1985; Chang & Miles, 1989; Van Griensven, 1988).

Mushroom production proceeds via a sequence of steps. First, the nutritive medium (compost) is inoculated with mushroom mycelia by distributing particulate material colonized with mushroom mycelia (spawn) through it, and then the compost is colonized with the mycelium. Mushroom spawn is generally made with sterilized grain that is inoculated with pure cultures of the desired mushroom strain. Virtually all spawn used to inoculate mushroom compost is made using rye, millet, wheat, sorghum, or other grain substrate. Next, the colonized compost is covered by a layer of nutrient poor material (casing). The casing layer is usually composed of moistened peat moss and limestone. The mycelium proceeds to colonize this layer, and once the casing layer is colonized, the growing room environment is altered to promote the formation of fruiting bodies. These fruiting bodies are harvested and sold as commercial mushrooms.

The time-consuming stages of mushroom production are the periods when the mycelia are colonizing a new material. One way that has been used to accelerate the process is to mix colonized material, such as colonized compost, into the casing layer on top of the compost in the bed. Overall production time is reduced, because growth of the mycelia into the casing starts at many points throughout the casing layer rather than just at the interface with the colonized compost. By including a small amount of colonized material in the nutrient poor casing layer, the casing layer is colonized more quickly and the onset of mushroom production occurs earlier. This effectively increases the annual capacity of a mushroom farm without capital investment. This procedure is commonly referred to as "CACing" (Compost At Casing).

Although the CACing procedure accelerates production and increases capacity for a fixed area of mushroom bed, the colonized compost that is added to the casing layer as inoculum must come from somewhere. If it comes from mushroom beds, capacity equal to the amount of bed volume used to provide the casing inoculum is lost. Another problem with using locally developed inoculum is controlling quality. If the compost is weakly colonized, then the CACing procedure will not increase the rate of colonization enough to compensate for the loss of bed capacity. Even worse, because this supplemental inoculum is not sterilized, it has the potential for spreading infection by contaminating microorganisms throughout the mushroom house, thereby reducing the productive capacity of the house.

Some mushroom farmers have attempted to solve these problems by inoculating the casing layer with the same spawn that is used to inoculate the compost layer. Spawn for inoculating the compost layer is produced by aseptically mixing pure mushroom mycelia with sterile grains and incubating to allow colonization of the grain. The grain spawn has a consistent level of live mycelial content, but has a relatively high nutrient content (contributed by the grain). In order to be effective, the inoculum must be supplied at relatively high levels, and the resultant nutrient level in the casing layer can inhibit the formation of the mushroom primordia (fruiting bodies). It also increases the potential for growth of contaminating organisms (especially molds) by providing them with nutrients that are normally absent from the casing layer.

Recognizing these problems, Romaine (U.S. Pat. No. 4,803,800) teaches the production of a mushroom synthetic CACing agent (i.e., casing spawn) by encapsulation of nutrients in a hydrogel polymer. The sterilized substrate is inoculated with pure cultures of the mushroom fungus and inoculated in a manner equivalent to grain spawn, resulting in a consistent level of live mycelial content. The synthetic CACing agent is used to inoculate the mushroom casing layer rather than the compost. Use of this synthetic CACing agent speeds fruiting in the same manner as the natural CACing with compost. Nitrogen contents in the Romaine synthetic CACing agent are generally low, which helps to reduce the growth of competitor microorganisms. For example, Romaine teaches total nutrient levels of 2 to 6% (wt/vol of formula). Assuming the use of 100% protein as the nutrient source, total nitrogen would be about 0.96%. Some of Romaine's formulas contain Perlite, vermiculite, soy grits, or similar materials at about 2 to 6% (wt/vol) of the formula as texturizing agents.

Dahlberg & LaPolt (U.S. Pat. No. 5,503,647) teach the development of a mushroom casing spawn prepared from nutritionally inert particles (calcined earth, vermiculite, Perlite, etc) amended with nutrients. The casing spawn is formulated with low nitrogen contents (generally less than 1%) to allow inoculation of the mushroom casing layer with *Agaricus bisporus* mycelium without promoting the growth of pests and pathogens. Dahlberg & LaPolt teach that high levels of proteinaceous ingredients such as soybean fines, etc. are inhibitory to *Agaricus bisporus* growth. Generally, nitrogen levels above about 2% in a casing spawn formula result in reduced growth of *Agaricus bisporus* mycelium. This casing spawn formulation is also proposed as a substrate for inoculation of spawn during its preparation.

A number of "synthetic" or "non-grain" spawns have been taught. Stoller (U.S. Pat. No. 3,828,470) teaches spawn for use in inoculating compost in which the cereal substrate has been diluted with an inorganic material containing calcium carbonate or an organic flocculating agent. Stoller also teaches that mushroom mycelium will not grow on feedstuffs such as cottonseed meal, soybean meal, etc., when used alone as an autoclaved substrate. Nitrogen contents in Stoller's examples are generally low. For example, Stoller's example 16 is estimated to contain about 0.22% nitrogen. Stoller's example 18 is estimated to contain about 0.7% nitrogen. Stoller also teaches that a fine, granular or powdery spawn is preferable to the large, whole grain particles of grain spawn. This is generally due to the number of "points of inoculum" per unit weight of spawn. While there is no evidence that any of Stoller's formulations have ever been used as casing spawn, there is no known reason why they would not be satisfactory for this purpose.

Fritsche (1978) describes a formula reported by Lemke (1971) for spawn on a perlite substrate. The formula is as follows: perlite (1450 g), wheat bran (1650 g), $CaSO_4.2 H_2O$ (200 g), $CaCO_3$ (50 g), water (6650 ml). The pH after sterilization is 6.2 to 6.4. This formula is calculated to contain 1.10 to 1.34% nitrogen on a dry weight basis (assuming a typical nitrogen content of wheat bran of 2.24 to 2.72%). While there is no evidence that this perlite spawn formula has ever been used as casing spawn, there is no known reason why it would not be satisfactory for this purpose. Brini & Sartor (European Patent Application No. EP 0 700 884 A1) teach a substrate for inoculating mushroom compost consisting of a water retaining-dispersing agent (e.g. peat), a buffer, a protein containing component (e.g. soybean meal), a growth promoting material (e.g. corn gluten and/or corn starch) and water. The mixture is sterilized, inoculated with the mushroom fungus, and used to spawn mushroom compost. Nitrogen contents of the mixtures are 1.4 to 8.0 wt % nitrogen (based on the specified range of 4 to 20% protein). One would not expect this formulation to be successful as a casing spawn due to its high nitrogen content and the inhibitory effect of high nitrogen contents in mushroom casing layers (U.S. Pat. No. 5,503,647).

Several spawn makers have developed casing spawn products. While specific formulations are proprietary, most appear to be combinations of peat moss, vermiculite, perlite, charcoal, shredded compost, or other proprietary ingredients supplemented with low levels of nutrients. Table 1 summarizes nitrogen contents of eight commercially available casing spawn products. The analyses of the casing spawns were performed by the present inventors. Seven of the products have nitrogen contents at or below 1.2%, while one product has a nitrogen content of 2.01%. The low nitrogen contents of commercially successful casing spawn formulations confirms the widely held and stated (U.S. Pat. No. 5,503,647) beliefs that high nitrogen contents in the mushroom casing layer are detrimental to mushroom production.

TABLE 1

Nitrogen contents of commercially available casing spawn formulations.

| CASING SPAWN MANUFACTURER | WT % NITROGEN |
|---|---|
| AMYCEL SPAWN COMPANY | 1.17 |
| LAMBERT SPAWN COMPANY | 2.01 |
| Le LION SPAWN COMPANY | 1.16 |
| INTERNATIONAL SPAWN LABORATORY | 0.69 |
| ITAL SPAWN | 1.19 |
| SYLVAN SPAWN COMPANY | 0.58 |
| SWAYNE SPAWN COMPANY | 1.13 |
| VLASIC FARMS, INC | 1.20 |

The mushroom science literature contains several references to the detrimental effects of high nutrient levels, especially nitrogen, in the casing layer. U.S. Pat. No. 5,503,647 specifically states that casing spawn formulas containing greater than 0.7% bioavailable Kjeldahl nitrogen result in reduced mushroom yields.

It is important to distinguish available nutrients from non-available nutrients. Sphagnum peat moss frequently used in mushroom casing layers may contain from 0.75 to 3.5% Kjeldahl nitrogen (Fuchsman, 1986). Hypnum, or "black" peat, contains significantly higher nitrogen levels. Both of these peats, however, support good fruiting of *Agaricus bisporus* when used as a casing material. The nitrogenous materials in peats are generally "humic" in character, such as lignin and other mineralized nutrients. These are not readily available to the mushroom fungus and most microorganisms capable of colonizing the casing layer. If additional nutritionally available nitrogen compounds are added to the casing layer, fruiting is inhibited.

The single known exception to the paradigm of the inhibitory effect of available nitrogen in the casing layer is a report by Nair et al. (1993). These authors treated cottonseed meal with either formaldehyde or calcium sulfate to prepare a delayed release supplement similar to the technology used for compost supplements (i.e, see U.S. Pat. No. 3,942,969). The supplements were added to the mushroom casing layer at up to 8% of the fresh weight of the mixture. Mushroom yield increases of between 0.5% and 52% were attributed to this casing layer supplementation. The authors speculate that the preservative treatments denatured the proteins in the cottonseed meal and made them unavailable to competing microorganisms. They also considered the possibility that residual formaldehyde could suppress the growth of microbial competitors.

While Nair et al. (1993) reported that addition of treated cottonseed meal to the casing mixture did not result in the growth of fungal contaminants, tests in the present inventors' laboratory showed that this supplementation strategy often fails due to the heavy growth of molds. Further, the use of formaldehyde as a preservative treatment could represent a health and safety hazard. To the inventors' knowledge, the supplementation strategy described by Nair et al. (1993) has not been commercialized successfully.

SUMMARY OF THE INVENTION

It is an object of the present invention to provide a mushroom casing spawn to inoculate mushroom casing layers and minimize the time between casing and the onset of mushroom production.

It is a further object of this invention to provide a casing spawn in which the level of available nutrients is maximized to provide supplementary nutrients to the developing mushroom fruiting bodies.

It is a further object of this invention to provide supplementary nutrients to the mushroom casing layer without supporting the growth of pathogens or pests such as molds.

It is a further object of this invention to provide supplementary nutrients to the mushroom casing layer without the need to treat the nutrients with pesticides, denaturants, or other chemical or physical treatments to eliminate the growth of competing microorganisms.

It is a further object of this invention to provide a casing spawn that is fully sterilized before inoculation with *Agaricus bisporus* to eliminate the possibility of transmitting diseases or pests.

It is a further object of this invention to provide a casing spawn with small particles to provide the maximum number of points of inoculation in the mushroom casing layer.

It is yet another object of this invention to provide a formulated mushroom casing spawn that reduces the risks of sterilization failure and incomplete colonization of the mixtures by improving aeration of the mixtures and reducing the formation of clumps.

It is another object of the present invention to provide a mushroom bed having a compost layer and a casing layer.

It is another object of the present invention to provide a method of preparing a mushroom bed by application of a casing layer on a compost layer.

These and other objects are met by the present invention which comprises an improved mushroom casing spawn which is formulated with mixtures of: (a) proteinaceous ingredients such as corn gluten, feather meal, cracked soybeans, soybean meal, cottonseed meal, or other ingredient to provide a high nutrient content; (b) pelleted, shredded waste paper to provide multiple points of inoculum and water holding capacity; (c) particulate materials such as calcined earth, vermiculite, Perlite, or similar material to provide multiple points of inoculum, water holding capacity, aeration of mixtures, density, and a free flowing character to the mixtures, (d) calcium carbonate ($CaCO_3$) to neutralize pl, (e) optionally, gypsum ($CaSO_4.2\ H_2O$) to reduce clumping, and (f) water.

The casing spawn may optionally contain a small fraction of grain (i.e., rye, millet, wheat) as used in the prior art. Oleaginous ingredients such as various vegetable oils may be added to increase the total nutrient content of the casing spawn. The proteinaceous and oleaginous components of the casing spawn can be combined by using ingredients such as whole cracked soybeans which contain both protein and oil.

Mushroom casing spawn according to the invention generally contains (on a dry weight basis): 5 to 80 wt % proteinaceous ingredient, 2 to 30 wt % pelleted shredded waste paper, 5 to 60 wt % particulate material, and 1 to 10 wt % $CaCO_3$, 1 to 10 wt % $CaSO_4$. Water is added to between 40 and 54%. If used, grain is added at 1 to 50 wt % (dry weight basis). Mixtures are sterilized, inoculated, and incubated in a manner consistent with the prior art.

Mushroom casing spawn is generally used to inoculate mushroom casing layers at rates between 0.10 and 2.04% (fresh weight casing spawn/fresh weight casing), equivalent to 0.007 to 0.15 lb/ft$^2$ of casing area. When prepared and used as disclosed herein, mushroom casing spawn reduces the time to achieve full colonization of the mushroom casing layer and provides unexpected increases in mushroom yield and production efficiency. Mushroom casing spawn also eliminates the risk of mold growth and compost heating associated with the use of traditional compost supplements, and does not support the growth of molds or other pathogens and pests in the casing layer.

Because the casing spawn as disclosed is heavily colonized with *Agaricus bisporus* or other types of mycelium, most foreign microorganisms cannot grow well on the material. Therefore, the invention also provides a mushroom casing spawn with high levels of nutrients and containing no pesticides, denaturants, or other chemical or physical treatments to control the growth of competing microorganisms.

The invention as disclosed differs from the prior art as taught by Romaine (U.S. Pat. Nos. 4,803,800), Dahlberg & LaPolt (U.S. Pat. No. 5,503,647), Lemke (1971) and Fritsche (1978), and various commercially available products in that the nutrient content of casing spawn, especially the protein nitrogen content, is maximized. Typical nitrogen contents of casing spawn are approximately three-fold to eight-fold higher than of existing casing spawn formulations. The generally low nutrient contents of the existing casing spawns do not result in the mushroom yield increases observed with the present invention.

The primary intended purpose of this invention is to provide a means of inoculating the mushroom casing layer with actively growing *Agaricus bisporus* or other mycelium and supplementary nutrients in order to facilitate colonization of the casing layer and increase mushroom yield. However, the material of this invention may also be used as an inoculum support for a wide range of filamentous fungi and other microorganisms for a number of purposes. These include, but are not limited to: inoculation of compost with *Agaricus bisporus* mycelium, inoculation of substrates for other mushroom fungi, (including Pleurotus spp., Lentinula spp., and others), inoculation of other fungi into solid substrates, inoculation of biocontrol agents, and other purposes.

DETAILED DESCRIPTION

As disclosed, the present invention comprises a formulated mushroom casing spawn with sufficiently high nutrient content that mushroom yields are increased compared with low nutrient casing spawn formulas. The addition of nutrients to the casing layer can be in addition to or instead of supplements added to the compost. Mixtures of proteinaceous ingredients (corn gluten, soybean meal, feather meal, wheat bran, etc.) and/or oleaginous ingredients (cracked soybeans, soybean fines, soybean oil, corn oil, etc.), pelleted shredded waste paper composition, particulate materials to improve water holding capacity and aerate the mixture (calcined earth, vermiculite, Perlite, etc.), $CaCO_3$, $CaSO_4.2H_2O$ (optional), and water are prepared, steam sterilized, inoculated with starter cultures of *Agaricus bisporus*, and incubated at permissive conditions. After incubation to allow colonization of the casing spawn by the *Agaricus bisporus* mycelium, the casing spawn is used to inoculate mushroom casing layer in a manner equivalent to the prior art for mushroom casing spawn and compost used for CACing.

Although *Agaricus bisporus* will be discussed, it is understood that other species may be used such as Agaricus species as well as Coprinus species and Volvariella species.

A typical casing spawn formula (see example 1) contains approximately 6.0 to 6.5% (dry weight) nitrogen (Kjeldahl), although formulas with higher or lower nitrogen contents can be prepared. This nitrogen content is substantially higher than the approximately 2.25% (dry weight) nitrogen present in compost used for CACing, substantially higher than the ca. 0.60 to 2.0% nitrogen typically present in prior art casing spawn formulas, and substantially higher than the Perlite non-grain spawn formula described by Fritsche (1978) and Lemke (1971). While the phenomenon is not fully understood, and speculation should not limit the scope of the claims, it is believed that the heavy colonization of the casing spawn substrate by the *Agaricus bisporus* mycelium exerts a biological control on the bio-availability of nutrients. The colonized nutrients are not available to competing microorganisms, and the *Agaricus bisporus* mycelium can use the nutrients to more efficiently produce mature mushrooms. It is not known whether *Agaricus bisporus* can absorb nutrients directly from the casing layer or whether the practice of watering the casing layer transports the nutrients to the compost.

Points of inoculum: Casing spawn as disclosed contains significantly more particles per unit weight than casing spawns in the prior art. The casing spawn has at least 10,000 particles per 100 g, preferably at least 20,000 particles per 100 g, more preferably at least 30,000 particles per 100 g and most preferably at least 40,000 particles per 100 g.

While Fritsche (1978) does not specify the Perlite particle size used, Perlite particles typically have dimensions of at least several millimeters. Casing spawn as described in U.S. Pat. No. 4,803,800 uses texturizing ingredients between about 100 to 6,000 $\mu M$ (0.1 to 6 mm). The particles in the final product would have average diameters of at least several millimeters. Casing spawn as described in U.S. Pat.

No. 5,503,647 specifies a range of particle sizes between 0.5 and 15 mm, most preferably between 2 and 4 mm in average size. Casing spawn (example 1 formula) is estimated to contain over 42,000 particles per 100 g (48% moisture content). It is difficult to accurately estimate the total number of particles because of their small size and large number. About 30% of the particles are smaller than 2.0 mm, and about 12% are smaller than 1.0 mm. Many of these particles are much less than about 0.2 to 0.4 mm. A large increase in the number of points of inoculum results from the use of ingredients with low bulk densities and fine textures. The small particles are fully colonized with *Agaricus bisporus* mycelium. When mixed with the casing mixture, they efficiently inoculate the mushroom casing layer. Because of the larger number, the average distance between casing spawn particles is smaller than with prior art formulas. Given that *Agaricus bisporus* has a fixed linear growth rate, the distance the mycelium must grow to reach confluence is reduced. As a result, the time to fully colonize the casing layer is also reduced compared with casing layers without a casing spawn or amended with a CACing material. Completion of the case holding period (i.e., time to flush the crop) is signaled by the appearance of the mushroom mycelia on the surface of the casing layer. Use of casing spawn therefore can reduce the total time between casing and flushing.

Completion of the case holding period is subjectively determined. In the absence of CACing material or casing spawn, crops are usually flushed 9 to 11 or more days after casing. Use of a CACing material or casing spawn can allow the crop to be flushed at about 4 to 6 days after casing. The improved casing spawn can allow the crop to be flushed as early as 3 to 4 days after casing. While specific casing spawn formulations and usage rates can be developed to allow flushing even earlier than this 3 to 4 day period, earlier flushing is not recommended. Full colonization of the casing layer without the development of mycelial anastomosis at the compost-casing layer interface can be detrimental to the health of the mushroom crop, and can result in reduced mushroom yields, pinning between the surface of the casing layer, and dirty mushrooms. One speculation about the success of the casing spawn formula as disclosed is that the high level of nutrients in the formulas better allow the development of the important compost-casing layer interface. Usage rates for the improved casing spawn are usually designed to provide flushing at 4 to 5 days after casing.

Casing spawn resists microbial growth: In casing spawn, all particles are colonized with *Agaricus bisporus* mycelium. This heavy mycelial growth is believed to effectively reduce or prevent the growth of competing microorganisms on the particles.

To demonstrate the effect of heavy *Agaricus bisporus* mycelial growth on competitor microorganisms, the following experiment was conducted. Casing spawn formula 83b was prepared and sterilized as usual. One replicate was inoculated with *Agaricus bisporus* and allowed to grow for 14 days. A second replicate was uninoculated and held under sterile conditions for 14 days. A rye spawn formula was prepared as usual, with one replicate inoculated and another left uninoculated. Sterility was relaxed on day 0 of this test, and all materials were placed in nonsterile petri dishes and maintained at 25 C, ca. 80% relative humidity. Materials were inspected daily for evidence of mold growth and bacterial contamination. Results of this test are summarized in Table 2.

TABLE 2

| TREATMENT | MICROBIAL GROWTH |
|---|---|
| RYE SPAWN | NO GROWTH IN 9 DAYS |
| RYE SUBSTRATE | MOLD AND BACTERIA, 4 DAYS |
| FORMULA 83 CASING SPAWN | NO GROWTH IN 9 DAYS |
| FORMULA 83 SUBSTRATE | MOLD AND BACTERIA, 4 DAYS |

This test clearly shows that colonization of a nutrient substrate by the *Agaricus bisporus* mycelium exerts a protective effect against attack by molds and bacteria. A similar antimicrobial effect is seen when spawn and casing spawn are added to compost or casing mixtures. As shown in several examples, casing spawns do not support mold growth in casing mixtures. The absence of growth of competitor microorganisms results in better primordium formation and better quality mature mushrooms.

Absence of chemicals and heat treatments: A clear advantage of the casing spawn formulas as disclosed is that the yield increases and protection against competitor microorganisms are achieved without the use of physical or chemical treatments, as described by Nair et al. (1993) for casing supplement. Addition of chemicals such as formaldehyde or fungicides to nutrient supplement mixtures can result in substantial cost disadvantages. The chemicals used may represent safety or environmental hazards. As noted by Romaine & Marlowe (U.S. Pat. No. 5,427,592), future use of biohazardous chemicals in the mushroom industry is tenuous. Formaldehyde has been restricted by the U.S. Environmental Protection Agency, and California now requires the routine monitoring of workers handling one mushroom supplement for formaldehyde exposure. By including supplementary nutrients in a material that is already subject to steam heat to achieve sterilization, substantial cost advantages can be achieved.

Principal nutrient source: The principal nutrient source is one that provides high levels of protein nitrogen. While corn gluten is a favored principal nutrient source, other ingredients may be substituted successfully. Corn gluten meal is the dried residue from corn after the removal of the larger part of the starch and germ, and the separation of the bran by the process employed in the wet milling manufacture of corn starch or syrup, or by enzymatic treatment of the endosperm. Corn gluten is water insoluble and hydrophilic, making it particularly suitable for use as a nutrient by a saprophytic fungus. Corn gluten is available from several sources, including Cargill, Inc. Corn gluten typically contains either 60% protein content (9.6% nitrogen) or 48% protein content (7.68% nitrogen). There is no apparent qualitative difference in performance using either 60% or 48% protein corn gluten. However, use of the 60% protein corn gluten allows the addition of higher nitrogen contents to a given casing spawn formula.

Hydrolyzed feather meal is also a favored principal nutrient that can be used alone or in combination with corn gluten or other nutrient source. Feather meal is the product resulting from the treatment under pressure of clean, undecomposed feathers from slaughtered poultry. Feather meal typically contains 80–85% protein, with over 75% of the crude protein in a digestible form. Feathers contain a high content of keratin, a class of fibrous proteins found in vertebrate animals. Because of extensive cross linking of disulfide bonds, keratins are more resistant to hydrolysis than most other proteins. This resistance to hydrolysis makes keratin suitable for use as a nutrient by a saprophytic fungus. Keratin can absorb and hold water, but is generally insoluble in water and organic solvents.

Other principal nutrient sources that have been used successfully in preparing casing spawn are listed in Table 3. The nutrients with the highest nitrogen contents are favored for use in casing spawn, since they allow the highest possible total nitrogen content in the finished product. The nutrient sources generally contain protein nitrogen and may contain fats, oils, carbohydrates, and micronutrients. Persons skilled in the art could imagine many more possible nutrient sources. While an abundance of experimental data show that protein nitrogen is a favored nutrient source for *Agaricus bisporus*, other nutrients in the proper form and proportion could easily be defined by routine experimentation.

Paper pellets: The preferred formula for paper pellets is 53% shredded paper (newsprint or bond paper), 22% peat moss (<35% moisture), 17% proteinaceous material (soybean fines, etc.), 5.4% $CaCO_3$, and 1.6% $CaSO_4 \cdot 2 H_2O$. The mixture is pelleted to a ⅛" diameter cylinders at 160 to 180 F and a 40 lb/hour feed rate. By assuring that the peat moss ingredient has a moisture of <35%, the finished pellets have a moisture content of <12%, and therefore do not support mold growth. The material typically has a nitrogen content of 1.5 to 1.6%. Pelleting is done to improve the handling of the material. The pelleted material has a higher density and lower volume than unpelleted material, and is well mixed. Pellets are hammer milled such that about 80% of the resulting fragments are <4.75 mm and >0.85 mm in size. The pellets fall apart after being hydrated to provide a larger number of small particles and "points of inoculum". Those skilled in the art could develop a casing spawn ingredient that is functionally equivalent to paper pellets using a range of ingredients and/or processes.

Particulate material: A particulate material such as calcined earth, perlite, vermiculite, or other ingredient is added to the casing spawn formula to provide multiple points of inoculum, increase water holding capacity, aerate the mixtures, control the density of the mixture, and help to maintain a free flowing characteristic. Typical particulate ingredients include calcined earth, vermiculite, and perlite, but other particulate materials can be substituted successfully.

Calcined earth is a clay based material that is subjected to a calcination process. The clay is heated to a temperature below its melting point to bring about a state of thermal decomposition. The calcination process results in a porous material that readily absorbs water. Depending on the particle size, calcined earth can absorb at least 100% of its weight in water. Calcined earth is commercially available under the "Turface", "Oil Dri", and other brand names. Calcined earth is available in a range of particle sizes. Dry calcined earth has a density of approximately 598 g/l for the 8⁄16 mesh size. Various particle sizes affect the density of the finished casing spawn product, and therefore are useful in formulating the product. The functional characteristics of calcined earth are similar regardless of the particle size. Smaller calcined earth particle sizes are perceived to be preferable in that they deliver more points of inoculum per unit weight.

Vermiculite is a hydrated magnesium-iron-aluminum silicate treated at high temperatures to cause expansion. The material has a low density (97 to 109 g/l), is water insoluble, and can absorb 200 to 500% of its weight in water.

Perlite is a volcanic glass material that is heated to cause its expansion and to improve its ability to hold moisture. It is typically used as a plant growth medium. It has a low density of about 109 g/l, and can absorb about 250% of its weight in water.

The selection of the appropriate particulate material for the casing spawn formula is based on desired final product density, particle sizes, desired number of particles (points of inoculum), cost, ease of handling and use, and other characteristics. The application equipment used by most mushroom growers is designed and optimized to deliver specific weights and volumes of CACing material or casing spawn. High density materials such as calcined earth can be mixed with low density materials such as vermiculite and perlite to closely approximate the density of existing spawns in the finished casing spawn formula.

One beneficial characteristic of the particulate materials used in casing spawn formulas is that they generally contain pores, hollows, and a rough texture. The *Agaricus bisporus* mycelium grows into these pores, and is protected from damage due to abrasion as spawn is shaken during preparation or immediately prior to its being added to casing mixtures. In most spawns, virtually all mycelial growth is on the surface of the kernels. When abraded, the surface mycelia are effectively scrubbed off, exposing the surface to potential contamination by competitor microorganisms. The protection from abrasion afforded by the rough texture of the particulate material makes the casing spawn resistant to the deleterious effect of shaking and abrasion.

The texture of the particulate materials is also of value in that the pores and hollows allow good aeration of the mixtures and help to avoid clumping of mixtures. Good aeration also helps in the sterilization process. Successful steam sterilization of a material requires that steam penetrate throughout the mass. A poorly aerated mixture restricts the penetration of steam. Dense clumps of material also restrict the penetration of steam. A failure of steam to penetrate the mixture results in cold spots that will not be successfully sterilized. The locally unsterilized areas of the mixtures reinoculate the substrate, resulting in contamination of the product. Sterilization failures are often due to the presence of bacterial spores, such as Bacillus spp. Bacillus contamination renders spawn unsuitable for use.

On occasion, a dense clump of a mixture achieves commercial sterility, but is not adequately colonized by the *Agaricus bisporus* mycelium due to poor oxygen penetration. *Agaricus bisporus* is a strictly aerobic fungus. Poor oxygen availability in the center of a clump of unmixed material restricts the growth of the fungus in the clump. When the uncolonized clump is eventually blended with mushroom casing layer, the nutrients can become available to microorganisms in the mixture. The availability of the nutrients results in the growth of competitor molds. Inclusion of a particulate material (i.e., calcined earth) in the casing spawn formula reduces the formation of clumps in the mixtures and allows better oxygen penetration in the clumps that do form.

Inorganic components: $CaCO_3$ is added to the casing spawn formula at up to approximately 7 to 8% of the total dry weight. This component helps to control the pH of the casing spawn through a buffering effect. *Agaricus bisporus* typically releases organic acids during growth. Inclusion of $CaCO_3$ in the formula avoids a significant reduction in pH during growth. Casing spawn formulas typically have a pH of about 7.2 immediately before being inoculated when made with tap water. The pH of the finished product is typically about pH 6.7. The exact content of $CaCO_3$ does not appear to be critical.

$CaSO_4 \cdot 2 H_2O$ (gypsum) may be added to the casing spawn formula at up to approximately 7 to 8% of the total dry weight. The $CaSO_4$ appears to coat the outside of the particles to avoid clumping and make any lumps that do form easier to break up. The $CaSO_4$ is an optional, but desirable, component of the formula. $CaSO_4$ and $CaCO_3$ may be premixed in a 1:1 mixture to simplify addition of the ingredients.

Water/moisture content: The optimum moisture content for casing spawn is 48% moisture at the time of addition to casing mixtures. While rye and millet spawns generally lose moisture during sterilization and growth, casing spawn formulas do not lose a significant amount of moisture due to evaporation. Therefore, most formulas are adjusted to 48 to 50% moisture prior to sterilization. This moisture content allows vigorous growth of *Agaricus bisporus* mycelium on the substrate and optimum performance in the compost. This lower moisture content also helps to prevent the formation of clumps and allows better oxygen penetration into the mixtures. This helps to prevent sterilization failure and uncolonized areas of the final product.

Preparation of Casing Spawn:

Casing spawn mixtures are prepared by placing dry ingredients in a large mixing container such as a paddle mixer, cement mixer, or other suitable container in which the mixtures can be blended to obtain homogeneity. Ingredients are weighed, placed in the mixer, and mixed until thoroughly blended. Sufficient water is added as a fine spray to bring the mixtures to approximately 48% moisture. Additional mixing after the addition of water reduces any clumping that may occur.

Polycarbonate jars (160 oz. total capacity) are filled with 6.2 lb of the hydrated mixtures. This weight of a standard casing spawn formula (i.e., formula 83) fills the jars to approximately 75 to 80% of capacity. Some formulas are denser than formula 83. With denser formulas, the jars contain less total volume. Jars are filled either manually or with an automated jar filling machine. Jars are capped with lids containing a breathable filter element that allows the passage of air and steam but prevents the passage of microorganisms that would contaminate the finished product. The mixtures are steam sterilized at times and temperatures needed to achieve commercial sterility. This is typically 255 F for 150 minutes. Following sterilization, mixtures are cooled to less than 80 F. Jars are briefly opened under aseptic conditions, and an inoculum is added. The inoculum may consist of millet or rye grain colonized with a suitable strain of the *Agaricus bisporus* fungus, and is added to jars at about 1.1 to 1.3% (vol/vol). Mixtures may also be inoculated with non-grain substrates colonized with *Agaricus bisporus* mycelium (U.S. Pat. No. 5,503,647) at a similar inoculation rate. Immediately following inoculation, jars are briefly shaken in a modified commercial paint shaker to distribute the inoculum throughout the mixture and to break up any lumps that may have formed during sterilization. Jars are incubated at approximately 25° C. for 4 to 6 days, at which time they are again shaken to evenly distribute the growing mycelium. After an additional 4 to 6 day incubation at 25° C., the mixtures are evenly colonized with mushroom mycelium. The casing spawn can be used immediately, or can be stored in the jars under refrigerated conditions (less than 38 to 40° F.). Alternatively, the contents of the jars can be transferred to ventilated plastic bags and stored pending use. Packaged mushroom spawn, including the presently disclosed casing spawn, is typically stored at less than 42° F. for approximately 14 to 21 days to allow the "regrowth" of the mycelium and the development of an even white color associated with heavy mycelial colonization.

While the above description describes the method of casing spawn used by the inventors, persons with ordinary skill could easily prepare casing spawn formulas by other methods used for spawn production.

Use of Casing Spawn:

Casing spawn as disclosed is used in a manner similar to standard casing spawn and CACing material. Details of use are inherent in the examples cited, and are familiar to those skilled in the art of growing mushrooms. Casing can include a number of different ingredients such as, but not limited to, peat moss, top soil, lime, and water. Other materials have been used such as coconut fiber, water treatment sludge, and other exotic or nonexotic materials.

Briefly, casing spawn is mixed with a mushroom casing material prior to, during, or after the casing material is added to the surface of the mushroom compost. If mixed prior to casing, it is added to the mixer used to combine peat moss, lime, and water prior to casing. While it is believed that the best performance of casing spawn is achieved when it is added to the mixture after the other ingredients are fully mixed, satisfactory performance is also achieved when all ingredients are mixed together at the same time. If casing spawn is applied during casing, it can be added to a casing belt, continuous peat mixer, or other system that prepares and delivers the casing material to the surface of the compost. It is important that the casing spawn be mixed to achieve an even distribution within the casing layer.

If casing spawn is added after casing, it can be uniformly spread over the surface of the casing. In this case, the casing spawn should be mixed with the casing layer with a rake, digging machine, or other tool to achieve a uniform distribution.

After packaging and storage under refrigerated conditions, the *Agaricus bisporus* mycelium can cause the substrate to knit together as a solid mass. For optimum performance, it is important that this mass be broken up to restore the fine texture of the material. The mass can be broken up manually or with a variety of hand tools and/or sieves or screens to achieve the proper texture. A more effective method is to use a garden shredder (such as Sears electric leaf shredder). Equivalent devices would be obvious to those skilled in the art.

The typical use rate for the improved casing spawn is between 0.01 and 0.15 $lb/ft^2$ of bed surface area to be covered by the casing material, preferably 0.025 to 0.10 $lb/ft^2$, and most preferably 0.04 to 0.055 $lb/ft^2$. There is no detriment to using casing spawn rates of up to 0.15 $lb/ft^2$, but levels of over about 0.15 $lb/ft^2$ result in reduced mushroom yield. Yield reductions progressively increase with increased usage rates over 0.015 lb/ft2. Similar use rates are effective for casing spawn inoculated with other fungi that require a casing layer, such as Stropharia.

EXAMPLES

Example 1

Formula 83

Corn Gluten (60% protein) . . . 29.0 g

Paper Pellets . . . 16.1 g

Calcined Earth (⅜ mesh) . . . 29.0 g

Feather Meal (15.4% nitrogen) . . . 19.4 g $CaCO_3/CaSO_4$ (1:1) . . . 6.5 g

Water . . . 75 ml

The nitrogen content of this formula is 6.63%. Casing spawn formula 83 was prepared essentially as described above, and was stored at <42 F pending use at the Vlasic Farms, Inc., Napoleon, Ohio mushroom research pilot plant. In this specific example, phase II mushroom compost was obtained from the Vlasic Farms Brighton Mushroom Farm (Howe, Ind.). The compost was a standard wheat straw/horse manure blend formula that had undergone a 22 day phase I composing process and a 9 day phase II process. Compost (193 lb fresh weight, equivalent to 72 lb dry weight at 63% moisture) was filled into each of 16 4'x3' wooden trays (6 lb/ft² dry weight). Trays were individually dumped onto a conveyor belt. All 16 trays were inoculated with 982 g of a proprietary spawn formulation, strain M466 (3% rate) and were amended with 654 g S41 supplement (2% rate; S41 consists of cracked soybeans treated with a hydrophobic coating and mold inhibitory composition). The spawn and supplement were thoroughly mixed into the compost, and compost was returned to the trays. Compost in all 16 trays was hydraulicly compressed, covered with polyethylene sheets to reduce moisture loss, and placed in an environmentally controlled room. Humidity in the room was maintained at 85%, and air temperature was controlled by a Fancom model 1060 mushroom computer in an attempt to maintain a 76° F. compost temperature. Compost and air temperatures were recorded at 240 min intervals with a data acquisition system, at 255 second intervals by the Fancom computer, and at daily intervals using mercury thermometers. Trays were inspected daily to assess the growth of the *Agaricus bisporus* mycelium and for the presence of molds. After 15 days of spawn run, trays were top dressed with a 2" casing layer consisting of Sunshine brand peat moss, $CaCO_3$, and water (to 85% moisture). The casing layer used for 8 trays was inoculated with 0.05 lb/ft² Vlasic Farms casing spawn (commercially available, proprietary formula). Two bales of peat moss (125 lb at 35% moisture) and 22 lb of $CaCO_3$ were placed in a ribbon blender. Sufficient water was added during continuous mixing to achieve a moisture content of 85%. After thorough mixing, casing spawn was added and the mixture was mixed for an additional 2 minutes. The casing layer used for the remaining 8 trays was inoculated with 0.05 lb/ft2 of formula 83 casing spawn. The same mixing procedure was used. All trays were placed in an environmentally controlled growing room. A standard temperature regime was maintained to promote mycelial growth into the casing layer, and trays were watered as needed. Because of the vigorous growth of the formula 83 casing spawn, those trays cased with the formula required more water than those cased with the Vlasic Farms commercial formula. All trays were "flushed" by the introduction of fresh air and reducing air temperature to 66° F. All trays were flushed on day 5 after casing. Mushrooms were first harvested 17 days after casing. Mushroom yield data (lb/ft²) for this test are as follows:

TABLE 3

Yield data (in lb/ft²) for experiment 907.

| SPAWN | 1ST BREAK | 2ND BREAK | 3RD BREAK | TOTAL |
|---|---|---|---|---|
| VLASIC FARMS CASING SPAWN | 1.47 A | 1.52 B | 1.58 A | 4.58 B |
| FORMULA 83 CASING SPAWN | 1.62 A | 2.25 A | 1.44 A | 5.32 A |

Values with the same letter in each column are not statistically significant at the 95% confidence level.

The average yield using the formula 83 casing spawn was 0.74 lb/ft² higher than using the standard Vlasic Farms commercial casing spawn. This yield increase is statistically significant at the 95% confidence level. No mold was observed in the casing layers of either treatment.

Example 2

| Formula 80 | Grams |
|---|---|
| Corn Gluten | 30.3 |
| Paper Pellets | 22.4 |
| Vermiculite | 19.4 |
| Calcined Earth | 18.8 |
| $CaCO_3$ | 9.1 |
| Water | 78.8 |
| % Nitrogen (Calc) | 3.54% |
| % Moisture (Calc) | 48.23% |

Example 3

| Formula 68 | Grams |
|---|---|
| Rye Grain | 27.8 |
| Corn Gluten | 27.8 |
| Paper Pellets | 27.8 |
| Vermiculite | 8.3 |
| $CaCO_3/CaSO_4$ (1:1) | 8.7 |
| Water | 75.0 |
| % Nitrogen (Calc) | 4.16% |
| % Moisture (Calc) | 48.23% |

Example 4

| Formula 78 | Grams |
|---|---|
| Rye Grain | 23.1 |
| Corn Gluten | 17.0 |
| Paper Pellets | 23.1 |
| Wheat Bran | 23.1 |
| Vermiculite | 6.9 |
| $CaCO_3/CaSO_4$ (1:1) | 6.9 |
| Water | 73.7 |
| % Nitrogen (Calc) | 4.27% |
| % Moisture (Calc) | 48.23% |

Example 5

| Formula 80b | Grams |
|---|---|
| Corn Gluten | 30.3 |
| Paper Pellets | 22.4 |
| Vermiculite | 19.4 |
| Calcined Earth | 18.8 |
| $CaCO_3/CaSO_4$ (1:1) | 9.1 |
| Water | 78.8 |
| % Nitrogen (Calc) | 3.54% |
| % Moisture (Calc) | 48.78% |

Example 6

| Formula 80c-2 | Grams |
|---|---|
| Corn Gluten (60%) | 8.0 |
| Paper Pellets | 33.6 |
| Vermiculite | 32.8 |
| Calcined Earth | 13.6 |

-continued

| Formula 80c-2 | Grams |
|---|---|
| CaCO$_3$ | 12.0 |
| Water | 80 |
| % Nitrogen (Calc) | 1.38% |
| % Moisture (Calc) | 48.64% |

Example 7

| Formula 80c-16 | Grams |
|---|---|
| Corn Gluten (60%) | 63.5 |
| Paper Pellets | 13.3 |
| Vermiculite | 13.0 |
| Calcined Earth | 5.4 |
| CaCO$_3$ | 4.8 |
| Water | 73.0 |
| % Nitrogen (Calc) | 7.01% |
| % Moisture (Calc) | 48.12% |

Example 8

| Formula 80d | Grams |
|---|---|
| Corn Gluten (60%) | 33.3 |
| Paper Pellets | 22.4 |
| Vermiculite | 18.2 |
| Calcined Earth | 17.0 |
| CaCO$_3$ | 9.1 |
| Water | 78.8 |
| % Nitrogen (Calc) | 3.87% |
| % Moisture (Calc) | 48.89% |

Example 9

| Formula 80d-4 | Grams |
|---|---|
| Corn Gluten (60%) | 78.4 |
| Paper Pellets | 7.3 |
| Vermiculite | 5.9 |
| Calcined Earth | 5.5 |
| CaCO$_3$ | 2.9 |
| Water | 72.5 |
| % Nitrogen (Calc) | 8.57% |
| % Moisture (Calc) | 48.37% |

Example 10

| Formula 80d-4 | Grams |
|---|---|
| Feather Meal (80%) | 69.4 |
| Paper Pellets | 10.3 |
| Vermiculite | 8.3 |
| Calcined Earth | 7.8 |
| CaCO$_3$ | 4.2 |
| Water | 72.2 |
| % Nitrogen (Calc) | 10.10% |
| % Moisture (Calc) | 48.01% |

Example 11

| Formula 80e-7 (P55) | Grams |
|---|---|
| Linseed Meal | 51.1 |
| Paper Pellets | 15.7 |
| Vermiculite | 13.2 |
| Calcined Earth | 13.6 |
| CaCO$_3$ | 6.4 |
| Water | 74.5 |
| % Nitrogen (Calc) | 3.63% |
| % Moisture (Calc) | 48.66% |

Example 12

| Formula 83 (P57) | Grams |
|---|---|
| Corn Gluten | 30.3 |
| Paper Pellets | 22.4 |
| Calcined Earth | 20.0 |
| Feather Meal | 18.2 |
| CaCO$_3$ | 9.1 |
| Water | 78.8 |
| % Nitrogen (Calc) | 6.58% |
| % Moisture (Calc) | 48.78% |

Example 13

| Formula 83-C5 (P57) | Grams |
|---|---|
| Cottonseed Waste | 30.3 |
| Paper Pellets | 22.4 |
| Calcined Earth | 20.0 |
| Feather Meal | 18.2 |
| CaCO$_3$ | 9.1 |
| Water | 78.8 |
| % Nitrogen (Calc) | 4.69% |
| % Moisture (Calc) | 48.78% |

Example 14

| Formula 83-s5 (P59) | Grams |
|---|---|
| Whole Soybeans | 51.1 |
| Paper Pellets | 15.7 |
| Calcined Earth | 14.0 |
| Feather Meal | 12.8 |
| CaCO$_3$ | 6.4 |
| Water | 76.6 |
| % Nitrogen (Calc) | 6.03% |
| % Moisture (Calc) | 48.74% |

Example 15

| Formula 83-c3 (P59) | Grams |
|---|---|
| Cottonseed Meal | 46.5 |
| Paper Pellets | 17.2 |
| Calcined Earth | 15.3 |
| Feather Meal | 14.0 |
| CaCO$_3$ | 7.0 |

-continued

| Formula 83-c3 (P59) | Grams |
|---|---|
| Water | 76.7 |
| % Nitrogen (Calc) | 6.48% |
| % Moisture (Calc) | 48.66% |

Example 16

| Formula 83-c4 (P59) | Grams |
|---|---|
| Ground Corn | 54.5 |
| Paper Pellets | 13.5 |
| Calcined Earth | 12.0 |
| Feather Meal | 14.5 |
| $CaCO_3$ | 5.5 |
| Water | 76.4 |
| % Nitrogen (Calc) | 3.61% |
| % Moisture (Calc) | 48.74% |

Example 17

| Formula 83-sh2 (P61) | Grams |
|---|---|
| Soybean Hulls | 30.3 |
| Paper Pellets | 22.4 |
| Calcined Earth | 20.0 |
| Feather Meal | 18.2 |
| $CaCO_3$ | 9.1 |
| Water | 78.8 |
| % Nitrogen (Calc) | 3.94% |
| % Moisture (Calc) | 48.78% |

Example 18

| Formula P69-1 | Grams |
|---|---|
| Feather Meal | 16.5 |
| Corn Gluten | 24.8 |
| Calcined Earth | 33.9 |
| Paper Pellets | 16.5 |
| $CaCO_3$ | 8.3 |
| Water | 78.4 |
| % Nitrogen (Calc) | 5.58% |
| % Moisture (Calc) | 48.23% |

Example 19

| Formula P69-2 | Grams |
|---|---|
| Feather Meal | 24.8 |
| Corn Gluten | 16.5 |
| Calcined Earth | 33.9 |
| Paper Pellets | 16.5 |
| $CaCO_3$ | 8.3 |
| Water | 78.4 |
| % Nitrogen (Calc) | 6.09% |
| % Moisture (Calc) | 48.23% |

Example 20

| Formula P71-3 | Grams |
|---|---|
| Peanut Hulls | 53.6 |
| Paper Pellets | 8.9 |
| Calcined Earth | 17.9 |
| Feather Meal | 14.3 |
| $CaCO_3$ | 5.4 |
| Water | 75.0 |
| % Nitrogen (Calc) | 3.61% |
| % Moisture (Calc) | 48.12% |

Example 21

| Formula P71-4 | Grams |
|---|---|
| Bone Meal | 55.6 |
| Paper Pellets | 9.3 |
| Calcined Earth | 18.5 |
| Feather Meal | 11.1 |
| $CaCO_3$ | 5.6 |
| Water | 75.9 |
| % Nitrogen (Calc) | 3.53% |
| % Moisture (Calc) | 48.48% |

Example 22

| Formula P73-w4 | Grams |
|---|---|
| Wheat Flour | 55.6 |
| Paper Pellets | 9.3 |
| Calcined Earth | 18.5 |
| Feather Meal | 11.1 |
| $CaCO_3$ | 5.6 |
| Water | 75.9 |
| % Nitrogen (Calc) | 3.69% |
| % Moisture (Calc) | 48.48% |

Example 23

| Formula P73-cs4 | Grams |
|---|---|
| Corn Starch | 50.0 |
| Paper Pellets | 8.3 |
| Calcined Earth | 16.7 |
| Feather Meal | 20.0 |
| $CaCO_3$ | 5.0 |
| Water | 230 |
| % Nitrogen (Calc) | 3.50% |
| % Moisture (Calc) | 48.45% |

Example 24

| Formula P73-bf4 | Grams |
|---|---|
| Barley Flour | 53.6 |
| Paper Pellets | 8.9 |
| Calcined Earth | 17.9 |
| Feather Meal | 14.3 |
| $CaCO_3$ | 5.4 |

-continued

| Formula P73-bf4 | Grams |
|---|---|
| Water | 73.2 |
| % Nitrogen (Calc) | 3.59% |
| % Moisture (Calc) | 47.59% |

Example 25

| Formula P83-cf8 | Grams |
|---|---|
| Corn Flour | 62.5 |
| Paper Pellets | 6.3 |
| Calcined Earth | 12.5 |
| Feather Meal | 15.0 |
| $CaCO_3$ | 3.8 |
| Water | 75.0 |
| % Nitrogen (Calc) | 3.61% |
| % Moisture (Calc) | 48.40% |

Example 26

| Formula P75-yc4 | Grams |
|---|---|
| Yellow Corn Meal | 43.5 |
| Paper Pellets | 10.9 |
| Calcined Earth | 21.7 |
| Feather Meal | 17.4 |
| $CaCO_3$ | 6.5 |
| Water | 78.0 |
| % Nitrogen (Calc) | 3.69% |
| % Moisture (Calc) | 48.66% |

Example 27

| Formula P75-bc4 | Grams |
|---|---|
| Blue Cornmeal | 43.5 |
| Paper Pellets | 10.9 |
| Calcined Earth | 21.7 |
| Feather Meal | 17.4 |
| $CaCO_3$ | 6.5 |
| Water | 78.0 |
| % Nitrogen (Calc) | 3.79% |
| % Moisture (Calc) | 48.66% |

Example 28

| Formula P75-rf4 | Grams |
|---|---|
| Rye Flour | 53.6 |
| Paper Pellets | 8.9 |
| Calcined Earth | 17.9 |
| Feather Meal | 14.3 |
| $CaCO_3$ | 5.4 |
| Water | 75.0 |
| % Nitrogen (Calc) | 3.63% |
| % Moisture (Calc) | 48.12% |

Example 29

| Formula P75-pm2 | Grams |
|---|---|
| Peanut Meal | 29.4 |
| Paper Pellets | 14.7 |
| Calcined Earth | 29.4 |
| Feather Meal | 17.6 |
| $CaCO_3$ | 8.8 |
| Water | 79.4 |
| % Nitrogen (Calc) | 5.72% |
| % Moisture (Calc) | 48.62% |

Example 30

| Formula P87-rf | Grams |
|---|---|
| Rye Flour | 64.1 |
| Paper Pellets | 6.4 |
| Calcined Earth | 12.8 |
| Feather Meal | 12.8 |
| $CaCO_3$ | 3.8 |
| Water | 74.4 |
| % Nitrogen (Calc) | 3.58% |
| % Moisture (Calc) | 48.28% |

Example 31

| Formula P87-wf | Grams |
|---|---|
| Wheat Flour | 63.4 |
| Paper Pellets | 7.6 |
| Calcined Earth | 15.2 |
| Feather Meal | 9.1 |
| $CaCO_3$ | 4.6 |
| Water | 76.2 |
| % Nitrogen (Calc) | 3.58% |
| % Moisture (Calc) | 48.83% |

Example 32

| Formula P87-bf | Grams |
|---|---|
| Barley Flour | 64.1 |
| Paper Pellets | 6.4 |
| Calcined Earth | 12.8 |
| Feather Meal | 12.8 |
| $CaCO_3$ | 3.8 |
| Water | 74.4 |
| % Nitrogen (Calc) | 3.53% |
| % Moisture (Calc) | 48.28% |

Example 33

| Formula P87-yc | Grams |
|---|---|
| Yellow Corn Meal | 51.7 |
| Paper Pellets | 8.6 |
| Calcined Earth | 17.2 |
| Feather Meal | 17.2 |
| $CaCO_3$ | 5.2 |

-continued

| Formula P87-yc | Grams |
|---|---|
| Water | 75.9 |
| % Nitrogen (Calc) | 3.76% |
| % Moisture (Calc) | 48.29% |

Example 34

| Formula P87-bc | Grams |
|---|---|
| Blue Corn Meal | 58.8 |
| Paper Pellets | 7.4 |
| Calcined Earth | 14.7 |
| Feather Meal | 14.7 |
| $CaCO_3$ | 4.4 |
| Water | 76.5 |
| % Nitrogen (Calc) | 3.57% |
| % Moisture (Calc) | 48.72% |

Example 35

| Formula P89-83b | Grams |
|---|---|
| Feather Meal | 20.0 |
| Corn Gluten | 30.0 |
| Calcined Earth | 20.0 |
| Paper Pellets | 20.0 |
| $CaCO_3$ | 10.0 |
| Water | 77.9 |
| % Nitrogen (Calc) | 6.80% |
| % Moisture (Calc) | 48.40% |

Example 36

| Formula P89-83b-3 | Grams |
|---|---|
| Feather Meal | 20.0 |
| Corn Gluten | 30.0 |
| Calcined Earth | 20.0 |
| Paper Pellets | 16.6 |
| $CaCO_3$ | 10.0 |
| Enhanced Oat Fiber | 3.4 |
| Water | 71.1 |
| % Nitrogen (Calc) | 6.99% |
| % Moisture (Calc) | 48.24% |

REFERENCES

Chang, S. T. & W. A. Hayes. 1978. The Biology and Cultivation of Edible Mushrooms. Academic Press, New York. 819 pp.

Chang, S. T. & P. G. Miles. 1989. Edible Mushrooms and Their Cultivation. CRC Press. Boca Raton, Fla. 345 pp.

Elliott, T. J. 1985. Spawn-making and Spawns. Chapter 8, Pages 131–139, In: Flegg, P. B., D. M. Spencer, & D. A. Wood. The Biology and Technology of the Cultivated Mushroom. John Wiley & Sons, Ltd. Chichester.

Fermor, T. R., P. E. Randle, & J. F. Smith. 1985. Compost as a Substrate and its Preparation. Chapter 6, Pages 81–109, In: Flegg, P. B., D. M. Spencer, & D. A. Wood. The Biology and Technology of the Cultivated Mushroom. John Wiley & Sons, Ltd. Chichester.

Flegg, P. B., D. M. Spencer, & D. A. Wood. 1985. The Biology and Technology of the Cultivated Mushroom. John Wiley & Sons, Ltd. Chichester. 347 pp.

Fritsche, G. 1978. "Breeding Work." Chapter 10, pages 239–250, In: Chang, S. T. & W. A. Hayes, Eds. "The Biology and Cultivation of Edible Mushrooms." Academic Press, NY.

Fuchsman, C. H. 1986. Peat and Water. Aspects of Water Retention and Dewatering in Peat. Elsevier, London.

Lemke, G. 1971. Erfahrungen mit Perlite beider Myzelanzucht und Fruchtkorperproduktion des Kulturchampgnons *Agaricus bisporus* (Lge.) Sing. Gartenbauwissenschaft 1: 19–27.

Nair, N. G., K. Y. Cho, & F. Mitchell. 1993. An alternative method of nutrient supplementation in the cultivation of the common mushroom *Agaricus bisporus*. Australian Journal of Experimental Agriculture 33:115–117.

Van Griensven, L. J. L. D. 1988. "The Cultivation of Mushrooms." Darlington Mushroom Laboratories, Ltd. Russington, Sussex, England. 515 pp.

TABLE 3

Nutrient sources for spawn-supplement

| NUTRIENT SOURCE | % NITROGEN |
|---|---|
| UREA | 42.00 |
| FEATHER MEAL | 15.30 |
| BLOOD MEAL | 14.38 |
| CORN GLUTEN | 11.00 |
| CONDENSED FISH SOLUBLES | 9.68 |
| DRIED ALGAE (SCENDESMUS) | 8.14 |
| PEANUT MEAL | 8.00 |
| SOYBEAN MEAL | 7.68 |
| YEAST SLUDGE | 7.65 |
| COTTONSEED MEAL | 7.50 |
| SAFFLOWER MEAL | 7.31 |
| CHEESE WHEY | 7.31 |
| SUNFLOWER MEAL | 7.16 |
| WHOLE CRACKED SOYBEANS | 6.40 |
| WHOLE SOYBEANS | 6.40 |
| CANOLA MEAL | 6.06 |
| LINSEED MEAL | 5.98 |
| DISTILLERS DRIED GRAIN | 4.75 |
| COTTONSEED WASTE | 3.89 |
| CORN STEEP LIQUOR | 3.65 |
| WHOLE CANOLA | 3.52 |
| ALFALFA | 2.96 |
| WHEAT BRAN | 2.75 |
| WHEAT FLOUR | 2.71 |
| CHICKEN LITTER | 2.70 |
| AMARANTH FLOUR | 2.58 |
| BONE MEAL | 2.45 |
| TURKEY LITTER | 2.20 |
| GRAPE PUMICE | 2.03 |
| SUNFLOWER HULLS | 1.84 |
| RYE FLOUR | 1.83 |
| PEANUT HULLS | 1.79 |
| BARLEY FLOUR | 1.76 |
| SOYBEAN HULLS | 1.62 |
| GROUND CORN | 1.53 |
| BLUE CORN MEAL | 1.48 |
| CORN FLOUR | 1.40 |
| YELLOW CORN MEAL | 1.26 |
| COTTONSEED HULLS | 0.64 |
| CORN STARCH | 0.11 |

We claim:

1. A mushroom bed having a casing layer and a compost layer wherein the casing layer comprises casing spawn comprising a mixture of: (a) at least one protcinaceous ingredient in an amount to provide in the casing spawn at least 3.5% nitrogen on a dry weight basis; (b) 2 to 30 wt % based on dry weight of paper pellets, (c) 5 to 60 wt % based on dry weight of at least one particulate material; (d) a buffer in an amount effective to provide a pH of about 6 to 7.8; and (e) water; and colonized with mushroom mycelium, wherein the (b) paper pellets, (c) particulate material, or both are present in an amount effective to provide at least 20,000 particles per 100 g of finished product.

2. The mushroom bed as claimed in claim 1 wherein the mushroom mycelium is *Agaricus bisporus*.

3. The mushroom bed as claimed in claim 1 wherein the casing layer further comprises peat moss, top soil, lime, water, and mixtures thereof.

4. The mushroom bed as claimed in claim 1 wherein the proteinaceous ingredient is selected from the group consisting of corn gluten, feather meal, cracked soybeans, soybean meal, cottonseed meal, and mixtures thereof.

5. The mushroom bed as claimed in claim 4 wherein the proteinaceous ingredient is corn gluten.

6. The mushroom bed as claimed in claim 1 wherein the casing spawn further comprises at least one oleaginous ingredient.

7. The mushroom bed as claimed in claim 6 wherein the oleaginous ingredient is selected from the group consisting of cracked soybeans, soybean fines, sunflowers, cracked sunflowers, and corn oil.

8. The mushroom bed as claimed in claim 1 wherein the particulate materials are selected from the group consisting of calcined earth, vermiculite, perlite, and mixtures thereof.

9. The mushroom bed as claimed in claim 1 wherein the casing spawn further comprises (f) gypsum in an amount effective to reduce clumping.

10. The mushroom bed as claimed in claim 1 wherein the casing spawn comprises on a dry weight basis: 5 to 80 wt % of the proteinaceous ingredient, 2 to 30 wt % of the paper pellets, 5 to 60 wt % of the particulate material, 1 to 10 wt % $CaCO_3$, and between 40 and 54% water.

11. The mushroom bed as claimed in claim 1 wherein the casing spawn further comprises 1 to 10 wt % $CaSO_4$.

12. The mushroom bed as claimed in claim 11 wherein the casing spawn comprises 7–8 wt% $CaCO_3$.

13. The mushroom bed as claimed in claim 1 wherein 80% of the paper pellets have a size of between about 0.85 and 4.75 mm.

14. The mushroom bed as claimed in claim 13 wherein the casing spawn further comprises 1 to 50 wt % grain.

15. The mushroom bed as claimed in claim 1 wherein the casing spawn has a moisture content of between about 46 and 52%.

16. The mushroom bed as claimed in claim 15 wherein the moisture content is between about 48 and 50%.

17. The mushroom bed as claimed in claim 1 wherein the at least one proteinaceous ingredient is present in an amount to provide in the casing spawn between about 6 and 6.5% nitrogen on a dry weight basis.

18. The mushroom bed as claimed in claim 1 wherein the buffer is calcium carbonate.

19. The mushroom bed as claimed in claim 1 wherein the pH is between 6.2 and 7.4

20. The mushroom bed as claimed in claim 1 wherein the (b) paper pellets, (c) particulate material, or both are present in an amount effective to provide at least 30,000 particles per 100 g of finished product.

21. The mushroom bed as claimed in claim 20 wherein wherein the (b) paper pellets, (c) particulate material, or both are present in an amount effective to provide at least 40,000 particles per 100 g of finished product.

22. The mushroom bed as claimed in claim 1 wherein the casing spawn is prepared by colonizing a mixture of (a) at least one proteinaceous ingredient in an amount to provide at least 3.5% nitrogen on a dry weight basis; (b) 2 to 30 wt % based on dry weight of paper pellets (c) 5 to 60 wt % based on dry weight of at least one particulate material, (d) a buffer in an amount effective to provide a pH of about 6 to 7.8, and (e) water; with mushroom mycelium wherein the (b) paper pellets, (c) particulate material, or both are present in an amount effective to provide at least 20,000 particles per 100 g of finished product.

23. The mushroom bed as claimed in claim 22 wherein the mushroom mycelium is *Agaricus bisporus*.

24. A method of preparing a mushroom bed comprising applying a casing layer to a compost layer wherein the casing layer comprises casing spawn comprising a mixture of: (a) at least one proteinaceous ingredient in an amount to provide in the casing spawn at least 3.5% nitrogen on a dry weight basis; (b) 2 to 30 wt % based on dry weight of paper pellets, (e) 5 to 60 wt % based on dry weight of at least one particulate material; (d) a buffer in an amount effective to provide a pH of about 6 to 7.8; and (e) water; and colonized with mushroom mycelium, wherein the (b) paper pellets, (c) particulate material, or both are present in an amount effective to provide at least 20,000 particles per 100 g of finished product.

25. The method as claimed in claim 23 wherein the mushroom mycelium is *Agaricus bisporus*.

* * * * *